(12) United States Patent
Ahn et al.

(10) Patent No.: US 10,643,036 B2
(45) Date of Patent: May 5, 2020

(54) LANGUAGE TRANSLATION DEVICE AND LANGUAGE TRANSLATION METHOD

(71) Applicant: Hyperconnect, Inc., Seoul (KR)

(72) Inventors: Sangil Ahn, Cheongju-si (KR); Kangsik Jung, Seoul (KR); Hyountaek Yong, Seoul (KR); Hyeok Choi, Seoul (KR)

(73) Assignee: Hyperconnect, Inc., Seoul (KR)

( * ) Notice: Subject to any disclaimer, the term of this patent is extended or adjusted under 35 U.S.C. 154(b) by 0 days.

(21) Appl. No.: 15/681,221

(22) Filed: Aug. 18, 2017

(65) Prior Publication Data

US 2018/0052831 A1   Feb. 22, 2018

(30) Foreign Application Priority Data

Aug. 18, 2016  (KR) .................... 10-2016-0104579

(51) Int. Cl.
*G06F 17/28* (2006.01)
*G06F 40/58* (2020.01)
(Continued)

(52) U.S. Cl.
CPC .............. *G06F 40/58* (2020.01); *G06F 40/51* (2020.01); *G10L 15/26* (2013.01); *G10L 15/265* (2013.01);
(Continued)

(58) Field of Classification Search
CPC ..... G10L 15/32; G06F 17/28; G06F 17/2809; G06F 17/2818; G06F 17/2827;
(Continued)

(56) References Cited

U.S. PATENT DOCUMENTS 5,075,850 A * 12/1991 Asahioka ............ G06F 17/2735
704/10
5,815,196 A * 9/1998 Alshawi ................. H04N 7/142
348/14.01
(Continued)

FOREIGN PATENT DOCUMENTS

EP         2770445 A2    8/2014
JP      2001-318919 A   11/2001
(Continued)

OTHER PUBLICATIONS

Office Action dated Jul. 20, 2017 of corresponding Korean Patent Application No. 10-2016-0104579—8 pages.
(Continued)

*Primary Examiner* — Richard Z Zhu
(74) *Attorney, Agent, or Firm* — Knobbe Martens Olson & Bear LLP

(57) ABSTRACT

A method of providing real-time translation for video chat is provided. The method includes: continuously receiving first-language voice data and at least one second-language word from a first terminal; continuously displaying the at least one second-language word at the same time as reproduction of the voice data; acquiring a second-language translation of an ended sentence included in a voice recognition result for the voice data; and substituting at least one word, which corresponds to the ended sentence in the displayed at least one second-language word, with the acquired translation. The at least one second-language word corresponds to respective words included in the voice recognition result for the voice data.

8 Claims, 18 Drawing Sheets

(51) Int. Cl.
*G10L 15/26* (2006.01)
*H04N 7/14* (2006.01)
*G06F 40/51* (2020.01)
*H04N 7/15* (2006.01)
*G06F 40/42* (2020.01)

(52) U.S. Cl.
CPC .............. *H04N 7/147* (2013.01); *H04N 7/15* (2013.01); *G06F 40/42* (2020.01)

(58) Field of Classification Search
CPC ............. G06F 17/2836; G06F 17/2845; G06F 17/2854; G06F 17/2863; G06F 17/2872; G06F 17/289
USPC ........................................................ 704/253
See application file for complete search history.

(56) References Cited

U.S. PATENT DOCUMENTS

| | | | | |
|---|---|---|---|---|
| 5,978,754 | A * | 11/1999 | Kumano | G06F 17/289 704/3 |
| 6,873,953 | B1 * | 3/2005 | Lennig | G10L 25/87 704/248 |
| 7,747,434 | B2 * | 6/2010 | Flanagan | G06F 17/289 348/461 |
| 8,983,850 | B2 * | 3/2015 | Hale | H04L 51/063 704/2 |
| 9,262,405 | B1 * | 2/2016 | Baliga | G06Q 30/0255 |
| 9,342,503 | B1 * | 5/2016 | Evans | G06F 9/454 |
| 9,547,641 | B2 * | 1/2017 | Bostick | G06F 17/2785 |
| 2004/0210444 | A1 * | 10/2004 | Arenburg | G06F 17/275 704/277 |
| 2007/0136470 | A1 * | 6/2007 | Chikkareddy | G06F 9/454 709/226 |
| 2007/0294080 | A1 * | 12/2007 | Bangalore | G06F 17/289 704/7 |
| 2008/0172637 | A1 * | 7/2008 | Chang | G06F 17/289 715/846 |
| 2008/0262827 | A1 * | 10/2008 | DeGroot | G06F 17/2827 704/3 |
| 2011/0246172 | A1 * | 10/2011 | Liberman | G06F 17/289 704/2 |
| 2013/0007405 | A1 * | 1/2013 | Caskey | G06F 17/289 711/206 |
| 2013/0282365 | A1 * | 10/2013 | Van De Ven | G06F 17/274 704/9 |
| 2015/0088484 | A1 * | 3/2015 | Bostick | G06F 17/2785 704/2 |
| 2015/0106702 | A1 * | 4/2015 | Scott | G06F 17/24 715/265 |
| 2015/0134320 | A1 | 5/2015 | Rangarajan Sridhar et al. | |
| 2015/0134322 | A1 | 5/2015 | Cuthbert et al. | |
| 2015/0169551 | A1 | 6/2015 | Yun et al. | |

FOREIGN PATENT DOCUMENTS

KR 10-2011-0132960 A 12/2011
KR 10-1351264 B1 1/2014

OTHER PUBLICATIONS

Supplemental Searh Report in corresponding European Patent Application No. 17841734 dated Mar. 18, 2020, 1 page.

* cited by examiner

LANGUAGE TRANSLATION DEVICE AND LANGUAGE TRANSLATION METHOD

CROSS-REFERENCE TO RELATED APPLICATION

This application claims the benefit of Korean Patent Application No. 10-2016-0104579, filed on Aug. 18, 2016, in the Korean Intellectual Property Office, the disclosure of which is incorporated herein in its entirety by reference.

BACKGROUND

1. Field

One or more embodiments relate to a language translation device and a language translation method, which are capable of providing a smoother user experience with improved reactivity.

2. Description of the Related Art

With the developments of communication technologies and the miniaturization of electronic devices, personal terminals have become widely spread to general customers. In particular, personal portable terminals, such as smart phones or smart tablets, have recently been widely used. Most terminals include a communication function. A user may search on the Internet using a terminal or may exchange messages with another user.

Also, with the developments of small-sized camera technologies, small-sized microphone technologies, small-sized display technologies, and small-sized speaker technologies, most terminals such as smart phones include a camera, a microphone, a display, and a speaker. A user may use the terminal to record a voice or capture a video including a voice. The user may confirm the recorded voice through the speaker included in the terminal or the captured video through the display included in the terminal.

Also, the user may share the recorded voice or the captured video with another user using the communication function of the terminal. The user may send a previously recorded voice or a previously captured video to another user. Also, the user may send a voice or a video, which is being currently recorded or captured by the terminal, to another user in real time.

Also, at the same time, another user may send a voice or a video, which is being currently recorded or captured by its own terminal, to the user in real time. The display included in the terminal of the user may simultaneously display the image that is being currently captured by the terminal of the user and the image that is being currently captured by the terminal of another user. Also, the speaker included in the terminal of the user may simultaneously reproduce the voice that is being currently recorded by the terminal of another user. In other words, the user and another user may make a video call to each other using their own terminals.

The user and another user may or may not be acquainted with each other. A plurality of terminals, including the terminal of the user and the terminal of another user, may be connected to a server. The server may mediate between the terminal of the user and the terminal of another user. Therefore, even though the user and another user are not acquainted with each other, the user and another user may make a video call to each other through the mediation of the server.

A language used by the user may be different from a language used by another user. When users making a video call use different languages, the user may not understand what the other party is saying, even though the voice of the other party is reproduced through the speaker of the terminal of the user.

SUMMARY

Some example embodiments may provide a language translation device and a language translation method, which enable users making a video call to understand what the other party is saying, even though the users use different languages.

Some example embodiments may provide a language translation device and a language translation method, which are capable of providing a smoother user experience.

Some example embodiments may provide a language translation device and a language translation method, which are capable of providing a user experience with improved reactivity.

Some example embodiments may provide a language translation device and a language translation method, which are capable of providing an improved user experience.

Additional aspects will be set forth in part in the description which follows and, in part, will be apparent from the description, or may be learned by practice of the presented embodiments.

In some example embodiments, a language translation method may comprise: continuously receiving first-language voice data and at least one second-language word from a first terminal; continuously displaying the at least one second-language word at the same time as reproduction of the voice data; acquiring a second-language translation of an ended sentence included in a voice recognition result for the voice data; and substituting at least one word, which corresponds to the ended sentence in the displayed at least one second-language word, with the acquired translation. The at least one second-language word may correspond to respective words included in the voice recognition result for the voice data.

In some example embodiments, the continuously displaying of the at least one second-language word at the same time as the reproduction of the voice data may comprise: continuously reproducing at least a part of the voice data received till now, while the voice data is being received; and continuously displaying at least a part of the at least one second-language word received till now, while the at least one second-language word is being received.

In some example embodiments, the acquiring of the second-language translation may include receiving the translation from the first terminal or the second server.

In some example embodiments, the acquiring of the second-language translation may comprise: detecting the ended sentence from the voice recognition result for the voice data; transmitting the detected ended sentence to a first server; and receiving the second-language translation of the ended sentence from the first server.

In some example embodiments, the acquiring of the second-language translation may comprise: detecting the ended sentence from the voice recognition result for the voice data; retrieving the detected ended sentence from a first database; and when the second-language translation corresponding to the ended sentence is present in the first database, acquiring the second-language translation corresponding to the ended sentence from the first database as a result of the retrieving.

In some example embodiments, the acquiring of the second-language translation may comprise: detecting the ended sentence from the voice recognition result for the voice data; retrieving the detected ended sentence from a first database; when the second-language translation corresponding to the ended sentence is not present in the first database, transmitting the ended sentence to a first server; receiving the second-language translation of the ended sentence from the first server; and caching the ended sentence and the received second-language translation in the first database.

In some example embodiments, the at least one second-language word may have an identical or similar meaning to each word included in the voice recognition result for the voice data.

In some example embodiments, a language translation method may comprise: continuously receiving a first-language voice; continuously encoding the received voice; continuously acquiring a voice recognition result for the encoded voice; continuously converting each word included in the voice recognition result into a second-language word corresponding to the word; continuously transmitting the encoded voice and the converted second-language word to a second terminal; detecting an ended sentence included in the voice recognition result; acquiring a second-language translation of the detected ended sentence; and transmitting the acquired translation to the second terminal.

In some example embodiments, the continuously converting into the second-language word may comprise: calculating a similarity between a word order of the first language and a word order of the second language; and when the calculated similarity is greater than a reference value, continuously converting each word included in the voice recognition result into a second-language word having an identical or similar meaning thereto. The continuously transmitting to the second terminal may include, when the calculated similarity is greater than the reference value, continuously transmitting the encoded voice and the converted second-language word to the second terminal.

In some example embodiments, the continuously converting into the second-language word may comprise: transmitting the word included in the voice recognition result to a first server; and receiving the second-language word having an identical or similar meaning to the transmitted word from the second server.

In some example embodiments, the continuously converting into the second-language word may comprise: retrieving the word included in the voice recognition result from a second database; and when the second-language word corresponding to the retrieved word is present in the second database, acquiring the second-language word corresponding to the retrieved word from the second database as a result of the retrieving.

In some example embodiments, the continuously converting into the second-language word may comprise: retrieving the word included in the voice recognition result from a second database; when the second-language word corresponding to the retrieved word is not present in the second database, transmitting the retrieved word to a second server; receiving a second-language word having an identical or similar meaning to the transmitted word from the second server; and caching the transmitted word and the received second-language word in the second database.

In some example embodiments, the detecting of the ended sentence included in the voice recognition result may comprise: detecting an end point using an intonation included in the received voice, a blank period included in the received voice, or a sentence constituent of the word included in the voice recognition result; and defining, as the ended sentence, a section from a portion subsequent to a portion corresponding to a previous end point to a portion corresponding to the detected end point in the voice recognition result.

In some example embodiments, the end point may be detected by detecting an intonation corresponding to an end of a sentence in the received voice, detecting a blank period exceeding a specific time in the received voice, or detecting whether the voice recognition result includes words corresponding to all sentence constituents necessary for constituting a full sentence.

In some example embodiments, the acquiring of the second-language translation may comprise: transmitting the detected ended sentence to a first server; and receiving the second-language translation of the ended sentence from the first server.

In some example embodiments, the acquiring of the second-language translation may comprise: retrieving the detected ended sentence from a first database; and when the second-language translation corresponding to the ended sentence is present in the first database, acquiring the second-language translation corresponding to the ended sentence from the first database as a result of the retrieving.

In some example embodiments, the acquiring of the second-language translation may comprise: retrieving the detected ended sentence from a first database; when the second-language translation corresponding to the ended sentence is not present in the first database, transmitting the ended sentence to a first server; receiving the second-language translation of the ended sentence from the first server; and caching the ended sentence and the received second-language word in the first database.

In some example embodiments, a language translation method may comprise: continuously receiving, by a first terminal, a first-language voice; continuously encoding, by the first terminal, the received voice; continuously acquiring, by the first terminal, a voice recognition result for the encoded voice; continuously converting, by the first terminal, each word included in the voice recognition result into a second-language word corresponding to the word; continuously transmitting, by the first terminal, the encoded voice and the converted second-language word to a second terminal; continuously displaying, by the second terminal, the second-language word at the same time as reproduction of the encoded voice; detecting, by the first terminal, an ended sentence included in the voice recognition result; acquiring, by the first terminal, the second-language translation of the detected ended sentence; transmitting, by the first terminal, the acquired translation to the second terminal; and substituting, by the second terminal, a word, which corresponds to the translation among the displayed second-language words, with the translation.

In some example embodiments, a language translation device may comprise: a communication configured to continuously receive first-language voice data and at least one second-language word from a first terminal; and an output interface configured to continuously display the at least one second-language word at the same time as reproduction of the voice data. The communication interface may acquire a second-language translation of an ended sentence included in the voice recognition result for the voice data. The output interface may substitute at least one word, which corresponds to the ended sentence in the displayed at least one second-language word, with the acquired translation. The at least one second-language word may correspond to each word included in the voice recognition result for the voice data.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
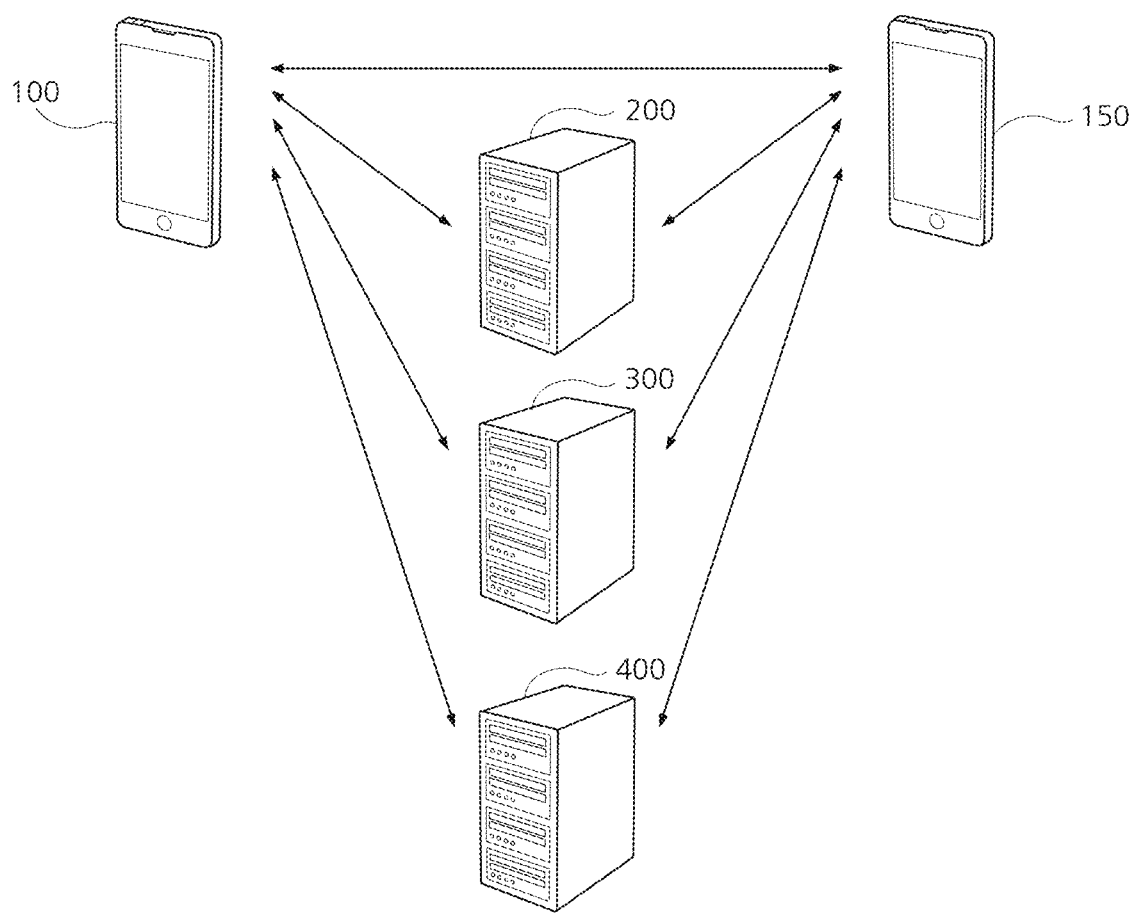
FIG. 1 is a network configuration diagram illustrating an environment in which a language translation device according to an embodiment operates.

Advantages and features and a method of achieving the same will be more clearly understood from embodiments described below in detail with reference to the accompanying drawings. However, the present disclosure is not limited to the following embodiments and may be implemented in various different forms. The embodiments are provided merely to complete disclosure and to provide those of ordinary skill in the art with the category of the present disclosure. The present disclosure is defined only by the claims. Wherever possible, the same reference numbers will be used throughout the specification to refer to the same or like components.

According to an aspect of the present invention, a method and system for providing video chat with a real-time translation feature is provided. Two or more users speaking different languages participate in a video chat using their smartphones. During the video chat, a first smartphone of a first user provides a video streaming to a second smartphone of a second user, and the second smartphone displays the video streaming in real-time. When the first use speaks a first sentence in a first language during the video chat, the first sentence is translated to a second language and a translation of the first sentence in the second language is displayed on the second smartphone. Even before the first user completes a sentence, already spoken fragments of the sentence can be translated to the second language and translation of the fragments are displayed in a second user's smartphone (e.g, fragment by fragment). To do so, the first smartphone monitors, records and analyzes voice input from the first user and create, or composes one or more fragments that will be translated individually. The first smartphone transmits the fragments (text transcript) one-by-one to a translation server to obtain translation of the fragments. Translations of the fragments (fragment-by-fragment translations) are sent to and displayed on the second smartphone while the first user is still speaking the current sentence. Subsequently, when the first user completes the current sentence, the smartphone transmits the sentence as a whole (including previously translated fragments) to the translation server to obtain a translation of the whole sentence. The translation of the whole sentence is sent to the second smartphone. As discussed above, the first user's speech during the video chat is translated twice: (1) fragment-by-fragment and (2) as a whole sentence.

In embodiments, a first smartphone 100 of a first user and a second smartphone 150 of a second user communicate for a video chat (and for text messaging during the video chat) between the users. The first smartphone listens to the first user's speech (spoken in a first language) and records the speech in an audio data format. Subsequently, the first smartphone transmits a first recording (audio data) of a first speech to at least one server 200, 300, 400 (speech-to-text server) for transcribing the first recording. In embodiments, a smartphone application installed on the first smartphone transcribes the first speech of the first user.

In embodiments, the first smartphone initiates transcribing of a recording when at least one of the following criteria has been met: (1) the recording reaches a predetermined length, (2) a silence (voice lower than a predetermined level) is identified after the recording reaches a predetermined length, (3) count of words/syllables identified (or identifiable) from the recording reaches a predetermined number (4) a silence is identified after a predetermined number of words/syllables identified from the recording.

In response to the first recording from the first smartphone, at least one speech-to-text (STT) server transcribes the first recording to a first transcript (text data) in the first language and transmits the first transcript to the first smartphone and/or the second smartphone. In embodiments, the first smartphone forwards the first transcript from the STT server to the second smartphone. In embodiments, the first transcript of the first speech is displayed in the first language on the first smartphone and/or the second smartphone during the video chat.

In response to the first transcript from the TTS server, the first smartphone transmits the first transcript to at least one server 200, 300, 400 (translation server) for translating the first transcript from the first language to a second-language that the second user understands or prefers to. The translation server translates the first transcript in the first language to a first translation transcript in the second-language and transmits the first translation transcript to the first smartphone and/or the second smartphone. In embodiments, the first smartphone forwards the first translation transcript from the translation server to the second smartphone. In embodiments, the first translation transcript (in the second-language) is displayed on the first smartphone and/or the second smartphone during the video chat. In embodiments, the first translation transcript replaces the first transcript previously displayed on the first smartphone and/or the second smartphone.

Subsequent to transmitting the first recording to the STT server, the first smartphone transmits a second recording (audio data) of the first user's second speech immediately following the first speech. The STT server transcribes the second recording to a second transcript in the first language and transmits the second transcript to the first smartphone (and/or the second smartphone). The first smartphone then transmits the second transcript to the translation server. The translation server translates the second transcript in the first language to a second translation transcript in the second language and transmits the second translation transcript to the first smartphone (and/or the second smartphone). In embodiments, the first smartphone forwards the second transcript and the second translation script to the second smartphone.

In embodiments, the first smartphone detects an ending of a first sentence comprising the first and second speeches and initiates translation of the first sentence. In embodiments, the first smartphone monitors, records and analyzes voice input from the first user and determines whether the first user has finished a current sentence (the first sentence) when (1) a silence (voice lower than a predetermined level) longer than a reference length is detected and/or (2) a particular pattern or intonation representing potential ending of sentence is detected from the first user's voice input. In embodiments, lengths of a silence to determine the first sentence's ending is longer than that of a silence indicating an ending of individual speeches/words in the first sentence or separating speeches/words in the first sentence.

In embodiments, when it is determined that the first user has finished the first sentence, the first smartphone transmits the first and second transcripts (and transcript of any additional speech in the first sentence, leading the first speech or following the second speech). In embodiments, the first smartphone keeps the first and second transcripts (in the first language) in it's memory (buffer) even after the first and second translation scripts have been received and displayed, and uses them for generating a request for translation of the first sentence to the translation server. In embodiments, for requesting translation of the first sentence, the first smartphone transmits the first and second recordings (and recording of any additional speech in the first sentence). In embodiments, the first smartphone maintains the first and second recordings in it's memory even after the first and second translation scripts have been received and displayed and uses them for generating a request for translation of the first sentence. In some embodiments, the request to translate the first sentence is sent from the second smartphone after the first smartphone detects the ending of the first sentence.

In response to a request to translate the first sentence, the translation server translates the first sentence (using all transcripts and/or recordings of the first sentence combined) to a first translation sentence (text data) in the second language. As such, the first and second speeches are translated to the second language twice: (1) individually to the first translation transcript and the second translation transcript and (2) collectively to the first translation sentence. The translation software transmits the first translation sentence to the first smartphone and/or the second smartphone for displaying during the video chat. In embodiments, the first translation sentence is transmitted from the first smartphone to the second smartphone. In embodiments, the first translation sentence of the first sentence is different from the combination of the first and second translation transcripts, and replaces previously displayed translation scripts of speeches of the first sentence on a display of the first or second smartphone.

Also, it will be understood that although the terms "first", "second", etc. may be used herein to describe various components, these components should not be limited by these terms. These terms are only used to distinguish one component from another. Therefore, a first component used herein may be a second component within the technical scope of the present disclosure.

The terminology used herein is for the purpose of describing particular embodiments only and is not intended to limit the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated components and/or steps, but do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, language translation devices 100 and 150 and language translation methods, according to embodiments, will be described in detail with reference to FIGS. 1 to 18.

FIG. 1 is a network configuration diagram illustrating an environment in which language translation devices 100 and 150 according to an embodiment operate. Referring to FIG. 1, the environment in which the language translation devices 100 and 150 operate may include a first language translation device 100, and a second language translation device 150 connected to the first language translation device 100.

According to another embodiment, the environment in which the language translation devices 100 and 150 operate may further include a first server 200 connected to the first language translation device 100 or the second language translation device 150. According to another embodiment, the environment in which the language translation devices 100 and 150 operate may further include a second server 300 connected to the first language translation device 100 or the second language translation device 150. According to another embodiment, the environment in which the language translation devices 100 and 150 operate may further include a third server 400 connected to the first language translation device 100 or the second language translation device 150.

The environment in which the language translation devices 100 and 150 may not include any of the first to third servers 200 to 400. According to another embodiment, the environment in which the language translation devices 100 and 150 may include at least a part of the first to third servers 200 to 400.

The first language translation device 100 may be a terminal. For convenience of description, the first language translation device 100 and the first terminal 100 are interchangeably used herein. The first terminal 100 may be, for example, a desktop computer, a laptop computer, a smart phone, a smart tablet, a smart watch, a mobile terminal, a digital camera, a wearable device, or a portable electronic device. The first terminal 100 may execute programs or applications.

The first terminal 100 may be connected to a communication network. The first terminal 100 may be connected to an external device via the communication network. The first terminal 100 may transmit data to the connected external device or receive data from the connected external device.

The communication network connected to the first terminal 100 may include a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), ZigBee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

Figure 2:
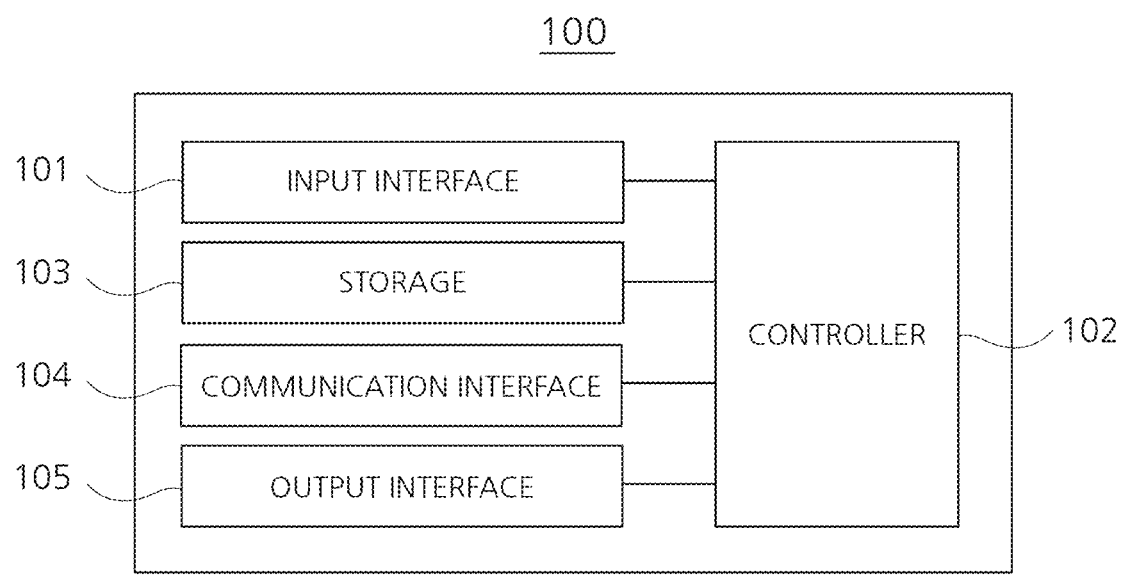
FIG. 2 is a block diagram illustrating a configuration of a language translation device according to an embodiment.

FIG. 2 is a block diagram illustrating the configurations of the language translation devices 100 and 150 according to an embodiment. Referring to FIG. 2, each of the language translation devices 100 and 150 according to an embodiment may include an input interface 101, a controller 102, a storage 103, a communication interface 104, and an output interface 105.

The input interface 101 may receive an external signal. The input interface 101 may receive signals from users of the language translation devices 100 and 150. Also, the input interface 101 may receive a signal from an external device.

The input interface 101 may include, for example, a microphone, a camera, a keyboard, a mouse, a track ball, a touch screen, a button, a switch, a sensor, a network interface, or other input devices. The input interface 101 may receive a voice from the exterior through the microphone included in the input interface 101. The input interface 101 may receive voices from the users of the language translation devices 100 and 150. Also, the input interface 101 may receive a voice from an external voice reproduction device.

The controller 102 may control operations of the language translation devices 100 and 150. The controller 102 may be connected to the components included in the language translation devices 100 and 150. The controller 102 may control operations of the components included in the language translation devices 100 and 150. The controller 102 may control the operations of the language translation devices 100 and 150 in response to a signal received by the input interface 101.

Also, the controller 102 may process a signal. The controller 102 may process a signal received by the input interface 101. For example, the controller 102 may process a signal received through the microphone included in the input interface 101.

Also, the controller 102 may perform an arithmetic operation. The controller 102 may perform an arithmetic operation according to a signal received by the input interface 101. The controller 102 may perform an arithmetic operation using a signal received by the input interface 101 or data stored in the storage 103. For example, the controller 102 may encode a voice received through the microphone included in the input interface 101. The controller 102 may perform control such that the result of the arithmetic operation is stored in the storage 103. The controller 102 may perform control such that the result of the arithmetic operation is displayed on the output interface 105.

The controller 102 may include, for example, a central processing unit (CPU), a graphic processing unit (GPU), a micro controller unit (MCU), or a microprocessor.

The storage 103 may store data. The storage 103 may store the result of the arithmetic operation performed by the controller 102. For example, the storage 103 may store a voice encoded by the controller 102. The storage 103 may store data to be transmitted to the exterior through the communication interface 104, or may store data received from the exterior through the communication interface 104.

The storage 103 may include a volatile memory or a non-volatile memory. The storage 103 may include, for example, flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), register, or the like. The storage 103 may include, for example, a file system, a database, or an embedded database.

The communication interface 104 may transmit data to the exterior or receive data from the exterior. The communication interface 104 may transmit data to the language translation devices 100 and 150, the first server 200, the second server 300, or the third server 400. The communication interface 104 may receive data from the language translation devices 100 and 150, the first server 200, the second server 300, or the third server 400. The communication interface 104 may transmit the result of the arithmetic operation performed by the controller 102 to the exterior. Also, the communication interface 104 may transmit data stored in the storage 103 to the exterior.

Data to be transmitted by the communication interface 104 or data received by the communication interface 104 may be stored in the storage 103. For example, the communication interface 104 may transmit the encoded voice stored in the storage 103 to the third server 400. Also, the communication interface 104 may receive a voice recognition result for the encoded voice from the third server 400 as a response to the transmission of the encoded voice.

The communication interface 104 may include a long-range network interface such as a 3G module, an LTE module, an LTE-A module, a Wi-Fi module, a WiGig module, an Ultra Wide Band (UWB) module, or a LAN card. Also, the communication interface 104 may include a short-range network interface such as an MST module, a Bluetooth module, an NFC module, an RFID module, a ZigBee module, a Z-Wave module, or an IR module. Also, the communication interface 104 may include other network interfaces.

The output interface 105 may output a signal to the exterior. The output interface 105 may, for example, display a screen, reproduce a sound, or output a vibration. The output interface 105 may include a display, a speaker, a vibrator, an oscillator, or other output devices.

The output interface 105 may display a screen. The controller 102 may control the output interface 105 to display a screen. The output interface 105 may display a user interface. The output interface 105 may display another screen in response to a user input.

The output interface 105 may display data. The output interface 105 may display the result of the arithmetic operation performed by the controller 102. The output interface 105 may display data stored in the storage 103. The output interface 105 may display data received by the communication interface 104. For example, the output interface 105 may display the voice recognition result received from the third server 400.

The output interface 105 may include a flat-panel display device such as a liquid crystal display (LCD), an organic light-emitting diode (OLED), or a plasma display panel (PDP). The output interface 105 may include a curved display or a flexible display. The output interface 105 may include a touch screen.

The second language translation device 150 may be a terminal. For convenience of description, the second language translation device 150 and the second terminal 150 are interchangeably used herein. A type of the second terminal 150 may be identical to or different from a type of the first terminal 100. The second terminal 150 may execute programs or applications.

The second terminal 150 may be connected to a communication network. The second terminal 150 may be connected to an external device via the communication network. The second terminal 150 may transmit data to the connected external device or receive data from the connected external device.

The second terminal 150 may be connected to the first terminal 100. The second terminal 150 may be connected to the first terminal 100 via the communication network. The second terminal 150 may transmit data to the first terminal 100 or receive data from the first terminal 100.

The first terminal 100 and the second terminal 150, which are connected to each other, may exchange messages, files, voice data, images, or videos with each other. Also, the first terminal 100 and the second terminal 150 may make a voice call or a video call to each other.

The first terminal 100 and the second terminal 150 may directly exchange data with each other. Also, the first terminal 100 and the second terminal 150 may exchange data with each other via the first server 200, the second server 300, the third server 400, or other mediating devices.

A language used by the user of the first terminal 100 may be identical to or different from a language used by the user of the second terminal 150. The language used by the first terminal 100 may be a first language. The first language may be, for example, Korean, English, Japanese, Chinese, German, French, Spanish, or Italian. The language used by the second terminal 150 may be a second language. The second language may be, for example, Korean, English, Japanese, Chinese, German, French, Spanish, or Italian. The first language and the second language may be identical to or different from each other.

The first server 200 may be connected to the first terminal 100 or the second terminal 150. When the first server 200 is connected to the first terminal 100, the first server 200 may exchange data with the first terminal 100 via the communication network. When the first server 200 is connected to the second terminal 150, the first server 200 may exchange data with the second terminal 150 via the communication network.

The first server 200 may be a dictionary server. The first server 200 may provide a dictionary service. The first server 200 may receive a first-language word from the first terminal 100 or the second terminal 150. The first server 200 may use the received first-language word to acquire a second-language word having an identical or similar meaning to the first-language word. The first server 200 may transmit the acquired second-language word to the first terminal 100 or the second terminal 150.

The second server 300 may be connected to the first terminal 100 or the second terminal 150. When the second server 300 is connected to the first terminal 100, the second server 300 may exchange data with the first terminal 100 via the communication network. When the second server 300 is connected to the second terminal 150, the second server 300 may exchange data with the second terminal 150 via the communication network.

The second server 300 may be a translation server. The second server 300 may provide a translation service. The second server 300 may receive a first-language sentence from the first terminal 100 or the second terminal 150. The second server 300 may use the received first-language sentence to acquire a second-language translation of the sentence. The second server 300 may transmit the acquired translation to the first terminal 100 or the second terminal 150.

The third server 400 may be connected to the first terminal 100 or the second terminal 150. When the third server 400 is connected to the first terminal 100, the third server 400 may exchange data with the first terminal 100 via the communication network. When the third server 400 is connected to the second terminal 150, the third server 400 may exchange data with the second terminal 150 via the communication network.

The third server 400 may be a voice recognition server. The third server 400 may provide a voice recognition service. The third server 400 may receive an encoded voice from the first terminal 100 or the second terminal 150. The third server 400 may perform voice recognition using the encoded voice. The third server 400 may convert the encoded voice into a text as the voice recognition result. The third server 400 may transmit the converted text to the first terminal 100 or the second terminal 150.

Hereinafter, specific operations of the language translation devices 100 and 150 according to an embodiment will be described in detail with reference to FIGS. 3 to 18.

Figure 3:
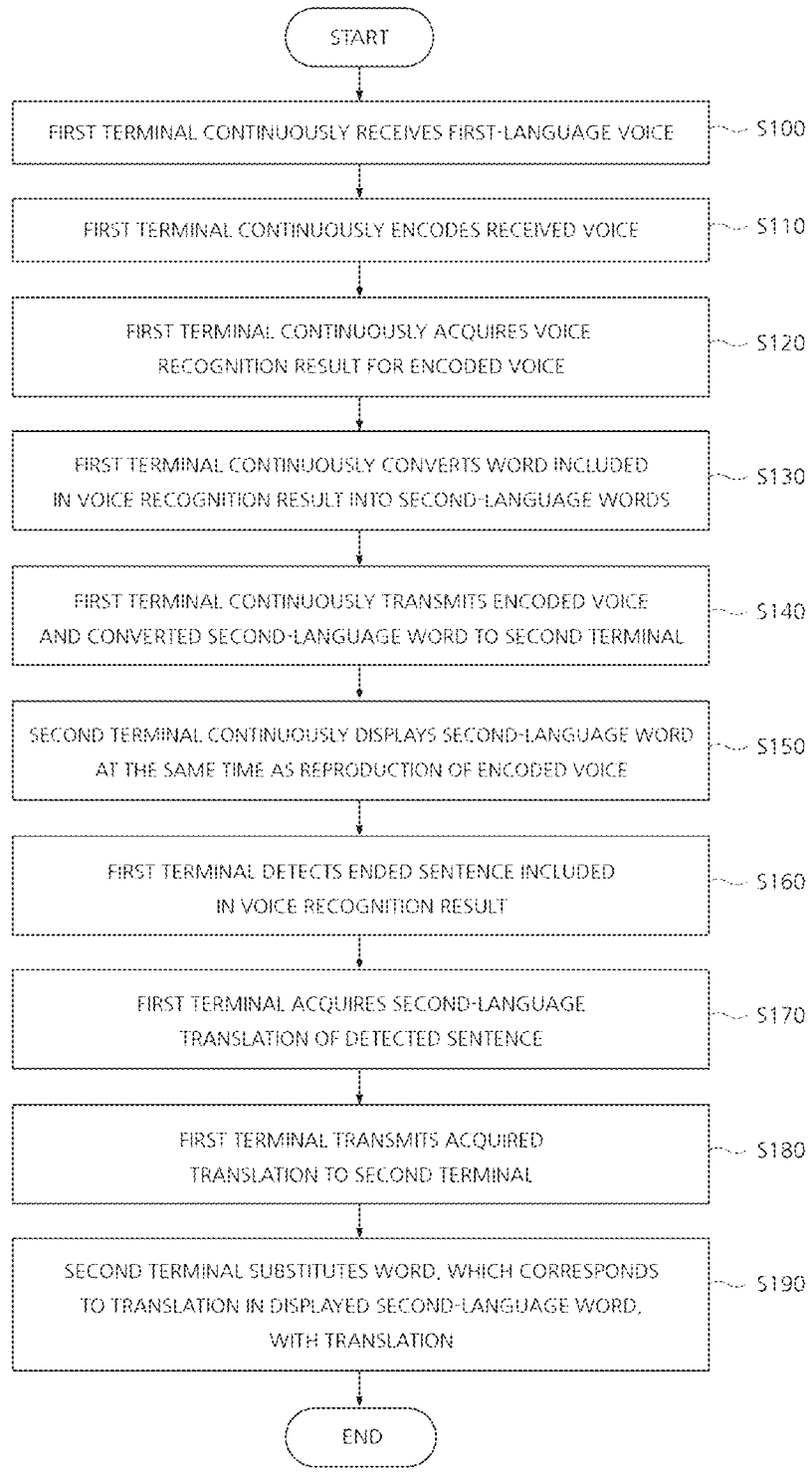
FIG. 3 is a flowchart of a language translation method that is performed by a language translation device, according to an embodiment.

FIG. 3 is a flowchart of a language translation method that is performed by the language translation devices 100 and 150, according to an embodiment. Referring to FIG. 3, in operation S100, the first terminal 100 may continuously receive a first-language voice.

The user of the first terminal 100 may speak in the first language toward the first terminal 100. Also, an external reproduction device may reproduce the first-language voice toward the first terminal 100. The first language may be, for example, Korean, English, Japanese, Chinese, German, French, Spanish, or Italian.

Figure 4:
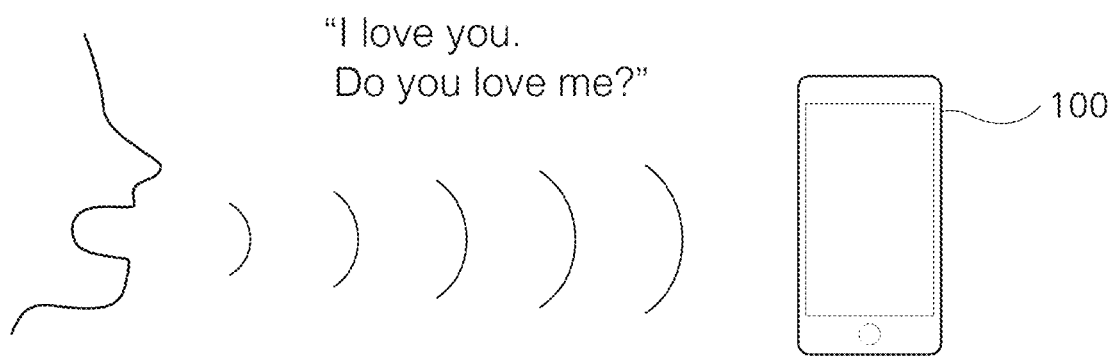
FIG. 4 is a reference diagram for describing a process of continuously receiving a first-language voice by a first terminal, according to an embodiment.

FIG. 4 is a reference diagram for describing operation S100 of continuously receiving the first-language voice by the first terminal 100, according to an embodiment. As illustrated in FIG. 4, the user of the first terminal 100 may speak in English toward the first terminal 100. In other words, the first language may be English. The user may speak two sentences "I love you. Do you love me?" in English.

The first terminal 100 may continuously receive the first-language voice through the microphone included in the input interface 101 of the first terminal 100. The first terminal 100 may receive the voice at the same time as the user's speaking. When the user speaks, the first terminal 100 may receive the voice in real time. When the user continuously speaks, the first terminal 100 may continuously receive the voice.

Referring to FIG. 3 again, in operation S110, the first terminal 100 may continuously encode the received voice. The controller 102 of the first terminal 100 may encode the voice being continuously received by the input interface 101. While the voice is being received, the controller 102 of the first terminal 100 may continuously encode at least a part of the voice received till now.

The controller 102 may encode the voice to convert the voice (analog signal) into an encoded voice (digital signal). The encoded voice may be stored in the storage 103. The controller 102 may perform acoustic echo cancellation to reduce echo phenomenon.

The controller 102 may continuously encode the voice being received. The controller 102 may encode the voice at the same time as the reception of the voice. When the voice is received, the controller 102 may encode the voice in real time. When the voice is continuously received, the controller 102 may continuously encode the voice.

In operation S120, the first terminal 100 may continuously acquire the voice recognition result for the encoded voice. The controller 102 of the first terminal 100 may continuously perform voice recognition using the encoded voice. The controller 102 may continuously convert the encoded voice into a first-language text as the voice recognition result.

According to another embodiment, the first terminal 100 may continuously acquire the voice recognition result for the encoded voice from the third server 400. The first terminal 100 may continuously transmit the encoded voice to the third server 400. The third server 400 may be a server that provides a voice recognition service. While the voice is being received, the communication interface 104 of the first terminal 100 may continuously transmit at least a part of the voice encoded till now to the third server 400.

The communication interface 104 of the first terminal 100 may continuously transmit the encoded voice to the third server 400. The communication interface 104 may transmit the encoded voice to the third server 400 at the same time as the encoding of the voice. When the voice is encoded, the communication interface 104 may transmit the encoded voice in real time. When the voice is continuously encoded, the communication interface 104 may continuously transmit the encoded voice. For example, the communication interface 104 may sequentially encode and sequentially transmit two sentences "I love you. Do you love me?" that the user spoke in English.

The communication interface 104 of the first terminal 100 may receive the voice recognition result for the encoded voice from the third server 400 as a response to the transmission of the encoded voice. While the voice is being received, the communication interface 104 of the first terminal 100 may continuously receive the voice recognition result from the third server 400.

The communication interface 104 may receive the voice recognition result as the first-language text. When the first language is English, the communication interface 104 may receive an English text as the voice recognition result.

The third server 400 may transmit the voice recognition result to the first terminal 100 at the same time as the recognition of the encoded voice. When the encoded voice is recognized, the third server 400 may transmit the voice recognition result in real time. When the encoded voice is continuously recognized, the third server 400 may continuously transmit the voice recognition result. The communication interface 104 of the first terminal 100 may continuously receive the voice recognition result from the third server 400.

For example, the first terminal 100 may sequentially receive "I love you do you love me" as the voice recognition result. The first terminal 100 may sequentially receive the words from "I" to "me" one by one or two or more at a time.

In operation S130, the first terminal 100 may continuously convert each word included in the voice recognition result into a second-language word. For example, it is assumed that the second language is Korean. The word "I" among the words included in "I love you do you love me" may be converted into "나는". The word "love" may be converted into "애정". The word "you" may be converted into "너". The word "do" may be converted into "하다". The word "me" may be converted into "나를". That is, the words included in "I love you do you love me" may be sequentially converted into "나는 애정 너 하다 너 애정 나를".

The first terminal 100 may convert the words included in the voice recognition result into second-language words, regardless of similarity between a word order of the first language and a word order of the second language. According to another embodiment, the first terminal 100 may convert the words into the second-language words according to similarity between a word order of the first language and a word order of the second language.

Figure 5:
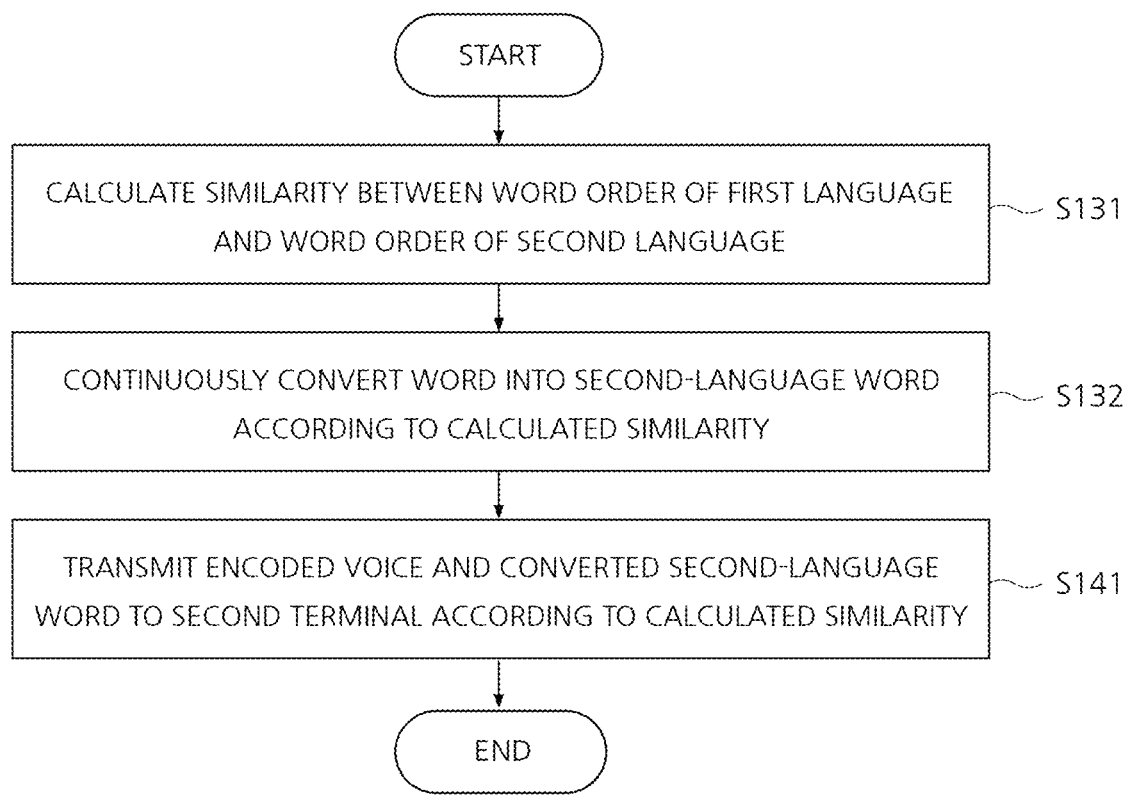
FIG. 5 is a flowchart of a process of continuously converting words into second-language words by the first terminal, according to an embodiment.

FIG. 5 is a flowchart of a process of continuously converting words into second-language words by the first terminal 100, according to similarity. Referring to FIG. 5, in operation S131, a similarity between a word order of the first language and a word order of the second language may be calculated. The controller 102 of the first terminal 100 may calculate the similarity between the word order of the first language and the word order of the second language.

The respective languages may have a specific order in which a subject, an object, and a transitive verb are arranged within one sentence. For example, in the case of an English or Chinese sentence, a subject, a transitive verb, are an object are arranged in this order. As another example, in the case of a Korean or Japanese sentence, a subject, an object, and a transitive verb are arranged in this order.

The controller 102 of the first terminal 100 may calculate the similarity using an order in which a subject, an object, and a transitive verb are arranged within a first-language sentence and an order in which a subject, an object, and a transitive verb are arranged within a second-language sentence. The storage 103 of the first terminal 100 may previously store information on the order in which a subject, an object, and a transitive verb are arranged within a sentence of each language. The controller 102 may calculate the similarity using the stored information.

For example, the similarity calculated when the first language is English and the second language is Chinese may be higher than the similarity calculated when the first language is English and the second language is Korean.

In operation S132, when the calculated similarity is greater than a reference value, words included in the voice recognition result may be continuously converted into second-language words having identical or similar meanings thereto. On the other hand, when the calculated similarity is not greater than the reference value, operation S132 of converting the words into the second-language words may not be performed. The first terminal 100 may or may not convert the words into the second-language words according to the calculated similarity.

For example, when the first language is English and the second language is Korean, the reference value may be identical to the calculated similarity. Therefore, when first language is English and the second language is Chinese, the first terminal 100 may continuously convert the words included in the voice recognition result into second-language words having identical or similar meanings thereto.

Figure 6:
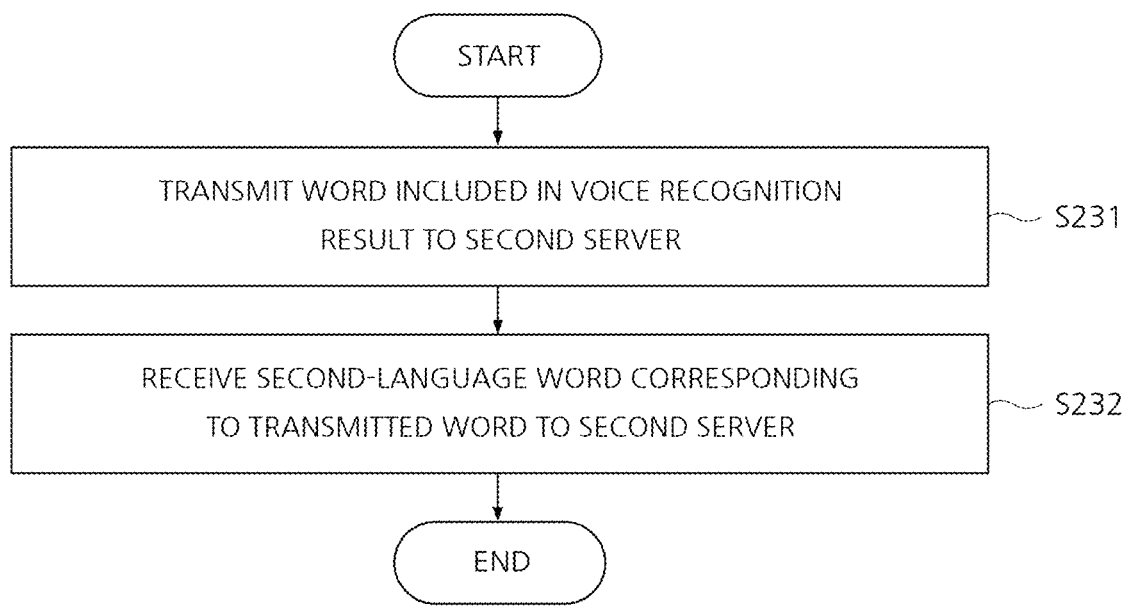
FIG. 6 is a flowchart of a process of continuously converting words into second-language words by the first terminal, according to another embodiment.

The first terminal 100 may directly convert the words included in the voice recognition result. According to another embodiment, the first terminal 100 may convert the words using an external server. FIG. 6 is a flowchart of a process of continuously converting the words into the second-language words using the external server in the first terminal 100.

Referring to FIG. 6, in operation S231, the words included in the voice recognition result may be transmitted to the second server 300. The communication interface 104 of the first terminal 100 may transmit the words included in the voice recognition result to the second server 300. The second server 300 may receive the words from the first terminal 100.

In operation S232, the second-language words having identical or similar meanings to the transmitted words may be received from the second server 300. The second server 300 may convert the received words into second-language words corresponding to the words. A meaning of the word received from the first terminal 100 may be identical to or similar to a meaning of the second-language word converted from the word. The second server 300 may transmit the converted second-language word to the first terminal 100. The first terminal 100 may receive the converted second-language word.

Figure 7:
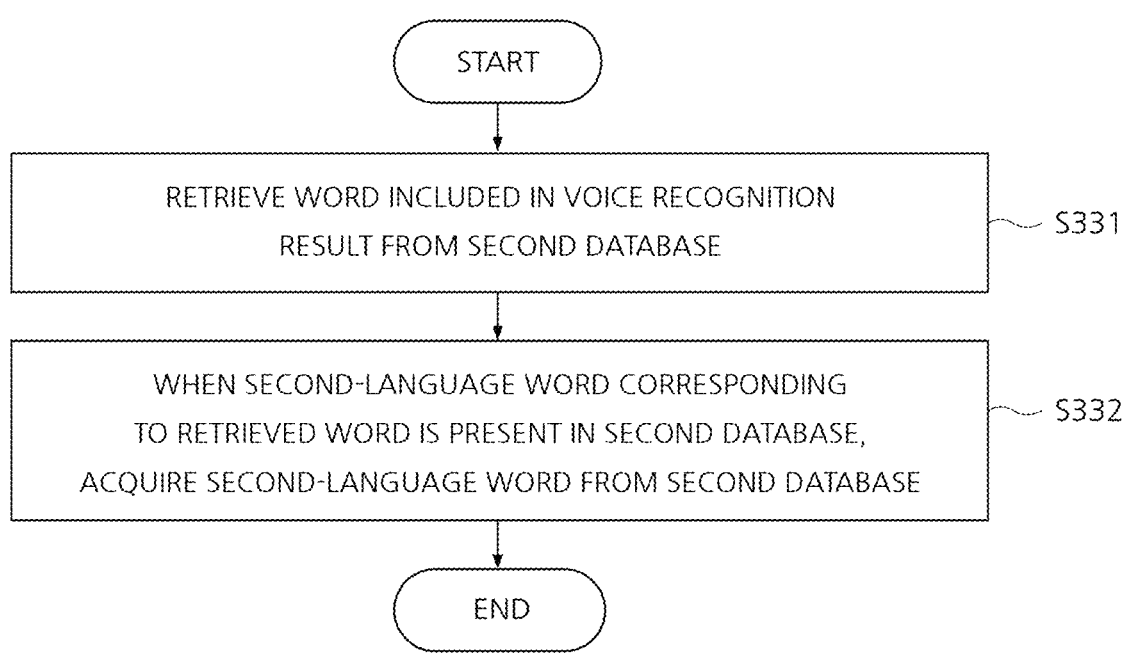
FIG. 7 is a flowchart of a process of continuously converting words into second-language words by the first terminal, according to another embodiment.

FIG. 7 is a flowchart of operation S130 of continuously converting words included in the voice recognition result into second-language words by the first terminal 100, according to another embodiment.

Referring to FIG. 7, in operation S331, the words included in the voice recognition result may be retrieved from a second database. The storage 103 of the first terminal 100 may include the second database. According to another embodiment, the second database may be disposed outside the first terminal 100.

The second database may be a dictionary database. The second database may be a relational database in which first-language words and second-language words corresponding to the first-language words are stored. A meaning of the first-language word may be identical to or similar to a meaning of the second-language word corresponding to the first-language word. Records included in the second database may include a first-language word and a second-language word corresponding to the first-language word.

The controller 102 of the first terminal 100 may retrieve a first-language word included in the voice recognition result from the second database. In this manner, the controller 102 may determine whether a second-language word corresponding to the first-language word is present in the second database.

In operation S332, when the second-language word corresponding to the retrieved word is present in the second database, the second-language word corresponding to the retrieved word may be acquired from the second database as a result of the retrieving. When a record corresponding to the first-language word is included in the second database, the controller 102 of the first terminal 100 may acquire the second-language word from the second database.

Figure 8:
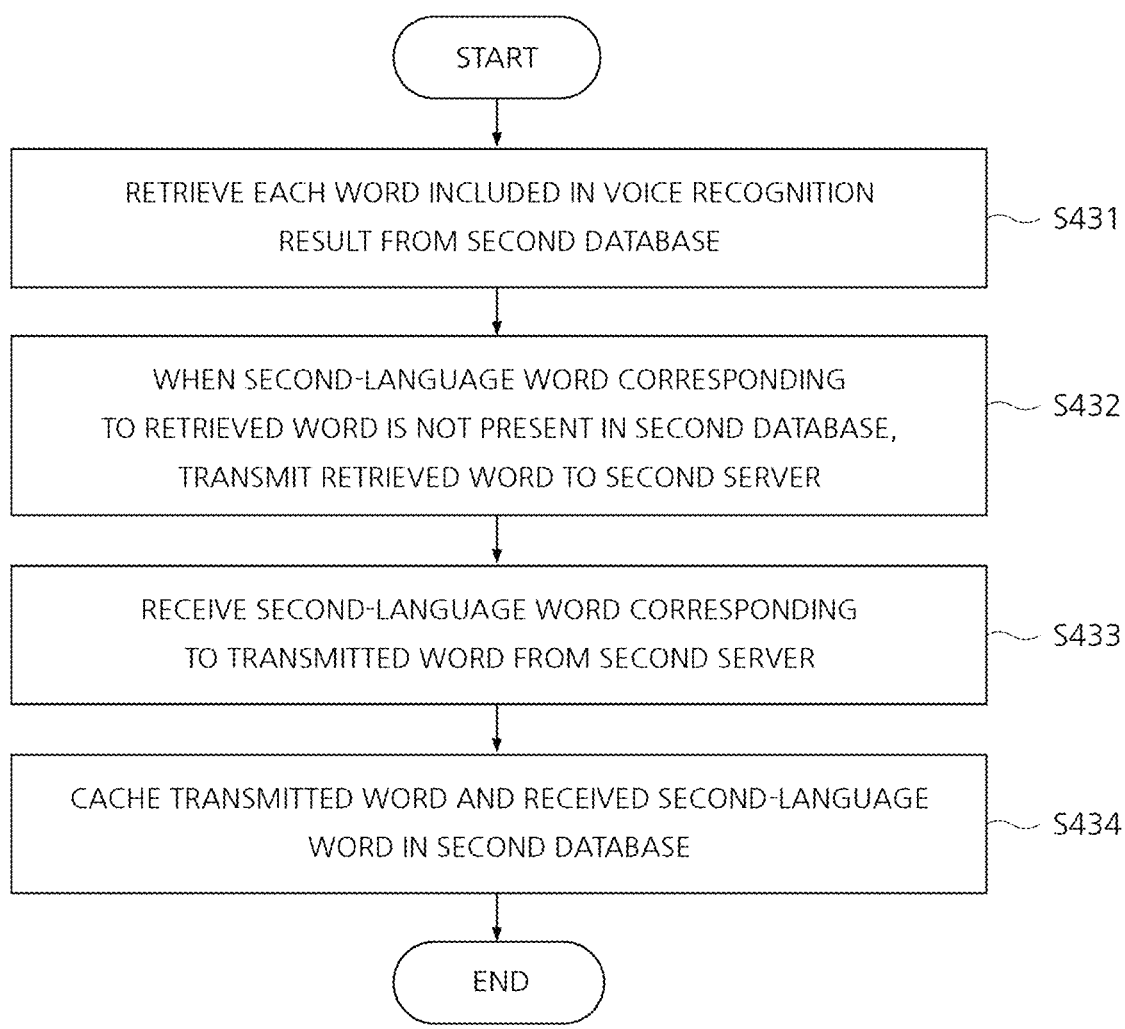
FIG. 8 is a flowchart of a process of continuously converting words into second-language words by the first terminal, according to another embodiment.

When the record corresponding to the first-language word is not included in the second database, the first terminal 100 may receive a second-language word corresponding to the first-language word from the second server 300. FIG. 8 is a flowchart of operation S130 of continuously converting words included in the voice recognition result into second-language words by the first terminal 100, according to another embodiment.

Referring to FIG. 8, in operation S431, the words included in the voice recognition result may be retrieved from the second database. In operation S432, when the second-language word corresponding to the retrieved word is not present in the second database, the retrieved word may be transmitted to the second server 300. The communication interface 104 of the first terminal 100 may transmit the first-language word to the second server 300.

The second server 300 may receive the first-language word from the first terminal 100. The second server 300 may convert the word into a second-language word corresponding to the word. The second server 300 may transmit the converted second-language word to the first terminal 100.

In operation S433, the second-language word having an identical or similar meaning to the transmitted word may be received from the second server 300. The communication interface 104 of the first terminal 100 may receive the second-language word from the second server 300.

In operation S434, the transmitted word and the received second-language word may be cached in the second database. The first terminal 100 may store the first-language word and the received second-language word in the second database. The second database may newly generate records including the first-language word and the received second-language word. Accordingly, when the first-language word is retrieved from the second database next time, the first terminal 100 may be ready to acquire the second-language word as a result of the retrieving.

Referring to FIG. 3 again, in operation S140, the first terminal 100 may continuously transmit the encoded voice and the converted second-language word to the second terminal 150. The communication interface 104 of the first terminal 100 may continuously transmit the encoded voice and the converted second-language word to the second terminal 150. While the voice is being received or the voice is being encoded, the communication interface 104 may continuously transmit at least a part of the voice encoded till now. Also, while the voice is being received or the words included in the voice recognition result are being converted, the communication interface 104 may continuously transmit the second-language words converted till now.

For example, the communication interface 104 of the first terminal 100 may sequentially transmit second-language words corresponding to the words included in "I love you do you love me". That is, the first terminal 100 may sequentially transmit "나는", "애정", "너", "하다", "너", "애정", and "나를" to the second terminal 150 as the second-language words.

Operation S140 in which the first terminal 100 continuously transmits the encoded voice and the converted second-language word to the second terminal 150 may be performed regardless of the similarity between the word order of the first language and the word order of the second language. For example, even though the similarity between the word order of the first language and the word order of the second language is not greater than the reference value, the first terminal 100 may continuously transmit the encoded voice and the converted second-language word to the second terminal 150.

According to another embodiment, operation S140 of continuously transmitting the encoded voice and the converted second-language word may be performed according to the similarity between the word order of the first language and the word order of the second language. Referring to FIG. 5, in operation S141, when the calculated similarity is greater than the reference value, the encoded voice and the converted second-language word may be continuously transmitted to the second terminal 150. The first terminal 100 may continuously transmit the encoded voice and the converted second-language word to the second terminal 150 according to the calculated similarity.

Referring to FIG. 3 again, in operation S150, the second terminal 150 may continuously display the second-language word at the same time as the reproduction of the encoded voice. The second terminal 150 may continuously receive the encoded voice and the converted second-language word from the first terminal 100.

The second terminal 150 may continuously decode the received encoded voice. The output interface 105 of the second terminal 150 may continuously reproduce the decoded voice. While the received encoded voice is being decoded, the output interface 105 of the second terminal 150 may reproduce at least a part of the voice decoded till now.

Also, the second terminal 150 may continuously display the received second-language word. The output interface 105 of the second terminal 150 may display the second-language word at the same time as the reproduction of the voice. When the second-language word is received, the output interface 105 of the second terminal 150 may display the second-language word in real time. When the second-language word is continuously received, the output interface 105 may continuously display the received second-language word. While the second-language word is being received, the output interface 105 of the second terminal 150 may continuously display at least a part of the second-language words received till now.

Figure 9:
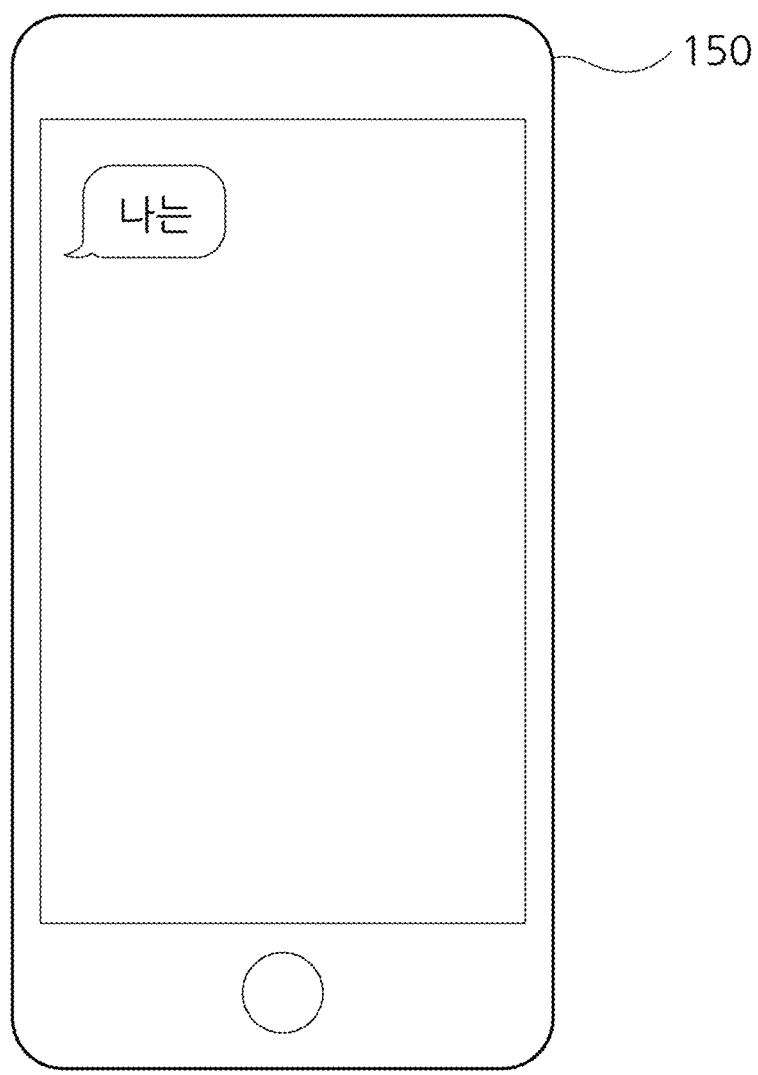
FIG. 9 is a reference diagram for describing a process of continuously displaying second-language words by a second terminal, according to an embodiment.
Figure 10:
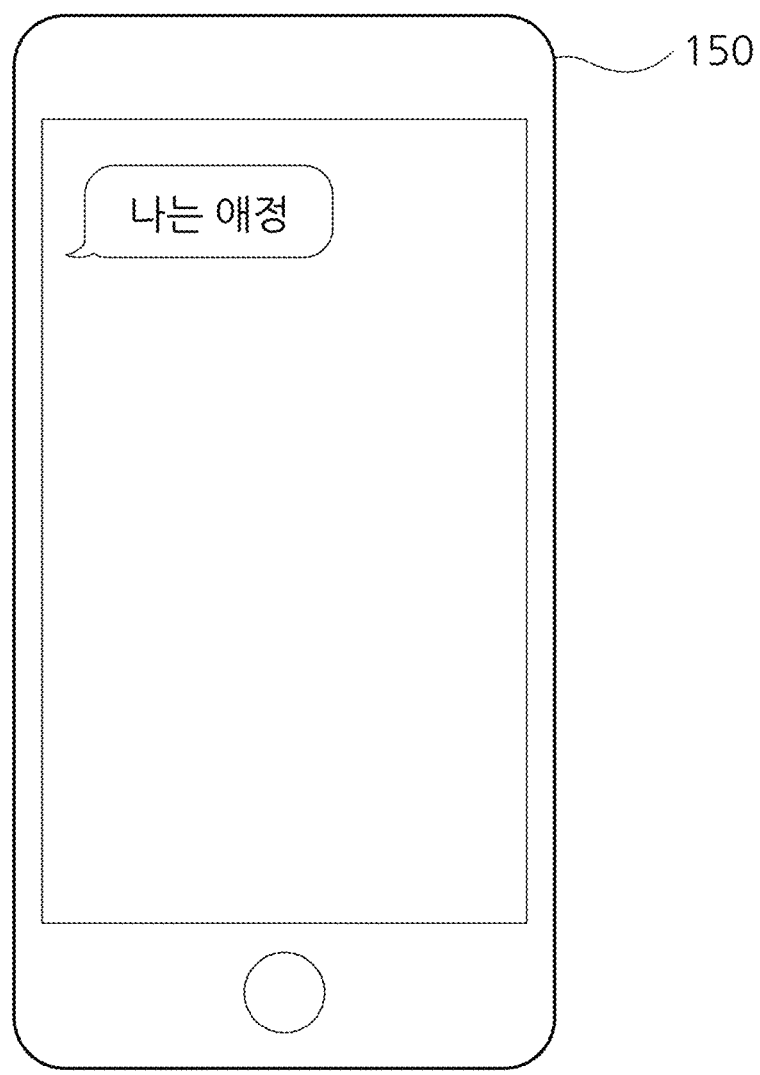
FIG. 10 is another reference diagram for describing a process of continuously displaying second-language words by the second terminal, according to an embodiment.
Figure 11:
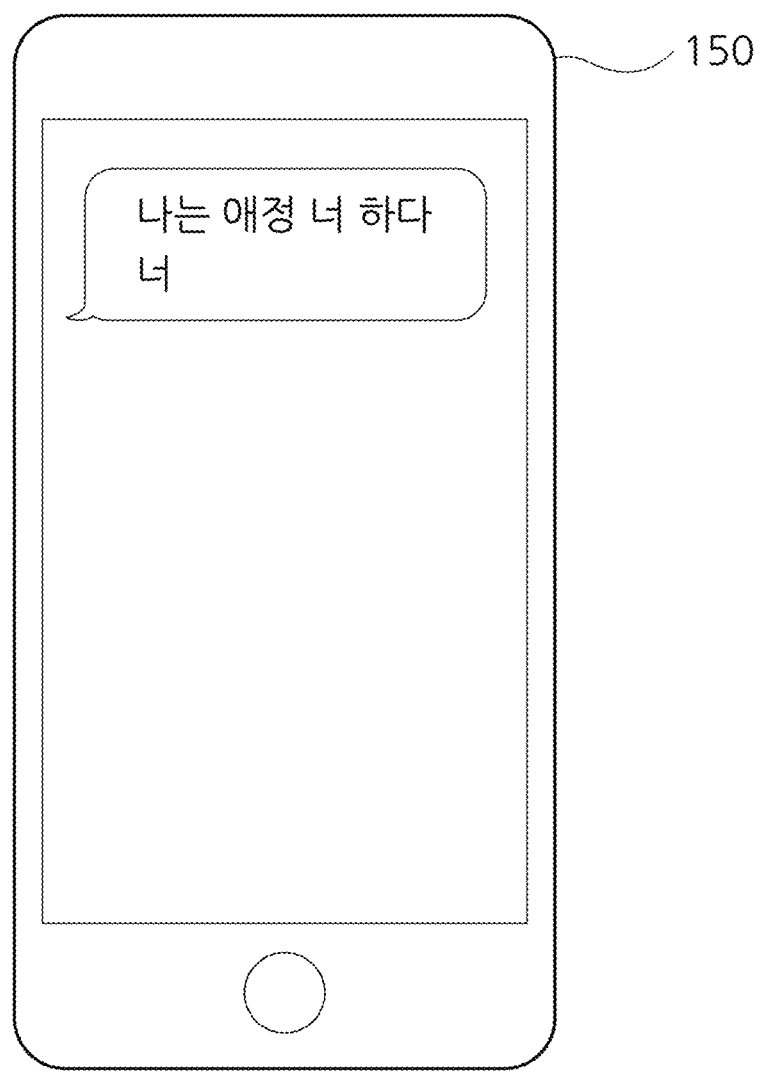
FIG. 11 is another reference diagram for describing a process of continuously displaying second-language words by the second terminal, according to an embodiment.

FIGS. 9 to 11 are reference diagrams for describing operation S150 of continuously displaying the second-language words by the second terminal 150, according to an embodiment. It is assumed that the second terminal 150 receives only "나는" from the first terminal 100 as the second-language word till now. The output interface 105 of the second terminal 150 may display "나는" as illustrated in FIG. 9.

Subsequently, the second terminal 150 may additionally receive "예정" as the second-language word. The output interface 105 of the second terminal 150 may additionally display "예정" as illustrated in FIG. 10. Subsequently, the second terminal 150 may additionally receive "너", "하다", and "너". The output interface 105 of the second terminal 150 may additionally display "너", "하다", and "너" as illustrated in FIG. 11.

Operation S150 in which the second terminal 150 continuously displays the second-language words may be performed regardless of the similarity between the word order of the first language and the word order of the second language. According to another embodiment, operation S150 in which the second terminal 150 continuously displays the second-language words may be performed according to the similarity between the word order of the first language and the word order of the second language. For example, when the similarity between the word order of the first language and the word order of the second language is not greater than the reference value, the second terminal 150 may not display the second-language word.

If the continuous conversion and display of the words included in the voice recognition result are performed even though the word order of the first language and the word order of the second language are not sufficiently similar to each other, readability experienced by the user of the second terminal 150 may not be sufficient. On the other hand, if the word order of the first language and the word order of the second language are sufficiently similar to each other and the continuous conversion and display of the words included in the voice recognition result are performed, readability experienced by the user of the second terminal 150 may be sufficiently ensured.

Therefore, according to embodiments of the invention, a smoother user experience can be provided. Furthermore, according to embodiments, a user experience with improved reactivity can be provided. Moreover, according to embodiments, an improved user experience can be provided.

Figure 12:
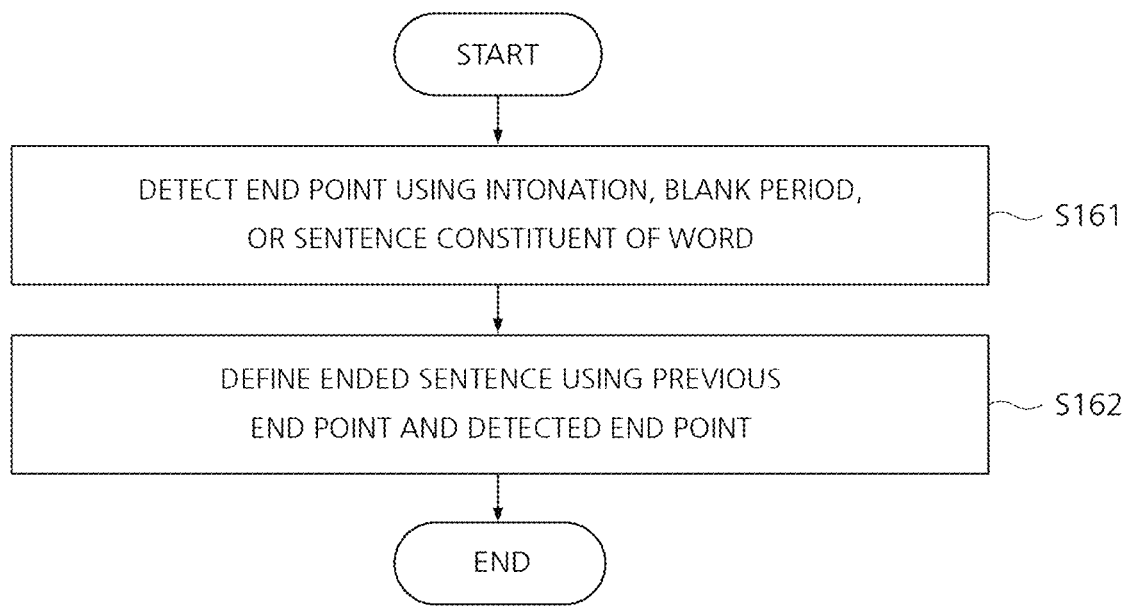
FIG. 12 is a flowchart of a process of detecting an ended sentence included in a voice recognition result by the first terminal, according to an embodiment.

Referring to FIG. 3 again, in operation S160, the first terminal 100 may detect an ended sentence included in the voice recognition result. FIG. 12 is a flowchart of operation S160 of detecting the ended sentence included in the voice recognition result by the first terminal 100, according to an embodiment.

Referring to FIG. 12, in operation S161, an end point may be detected using an intonation included in the received voice, a blank period included in the received voice, or a sentence constituent of the word included in the voice recognition result. For example, in the voice recognition result "I love you do you love me", the controller 102 of the first terminal 100 may define a point at which the first "you" is ended as the end point.

The controller 102 of the first terminal 100 may detect the end point by detecting the intonation corresponding to the end of the sentence from the received voice. The controller 102 of the first terminal 100 may detect information on a change in frequency according to the flow of time of the received voice. The storage 103 of the first terminal 100 may previously store information on a change in a voice frequency corresponding to the end of the sentence. The controller 102 of the first terminal 100 may detect the intonation corresponding to the end of the sentence from the received voice by comparing the detected information on the change in the frequency with the stored information on the change in the voice frequency.

According to another embodiment, the controller 102 may detect the end point by detecting the blank period exceeding a specific time from the received voice. For example, after finishing speaking one sentence, a user may pause in excess of 0.5 seconds before speaking a next sentence. The controller 102 of the first terminal 100 may detect the end point by detecting the blank period exceeding 0.5 seconds from the received voice.

According to another embodiment, the controller 102 may detect the end point by detecting whether the voice recognition result includes words corresponding to all sentence constituents necessary for constituting a full sentence. For example, the controller 102 of the first terminal 100 may detect whether the voice recognition result includes a word corresponding to a subject, a word corresponding to a transitive verb, and a word corresponding to an object. For example, it is assumed that the voice recognition result till now includes only a word corresponding to a subject and a word corresponding to a transitive verb. If the voice recognition result added later includes a word corresponding to an object, the controller 102 may define a point, at which the word corresponding to the object is ended in the voice recognition result, as the end point.

In operation S162, a section from a portion subsequent to a portion corresponding to a previous end point to a portion corresponding to the detected end point in the voice recognition result may be defined as the ended sentence. In a case where operation S160 of detecting the ended sentence from the voice recognition result is repeatedly executed, there may be a previous end point detected by an immediately preceding execution. In a case where operation S160 of detecting the ended sentence from the voice recognition result is executed for the first time, the previous end point may be defined as a start point of the voice recognition result.

The controller 102 may define, as the ended sentence, a section from a portion subsequent to a portion corresponding to a previous end point to a portion corresponding to the detected end point in the voice recognition result. For example, in the voice recognition result "I love you do you love me", the controller 102 may define "I love you" as the ended sentence.

Referring to FIG. 3 again, in operation S170, the first terminal 100 may acquire a second-language translation of the detected ended sentence. The first terminal 100 may directly convert the ended sentence into the second-language translation. According to another embodiment, the first terminal 100 may convert the ended sentence into the second-language translation using an external server.

Figure 13:
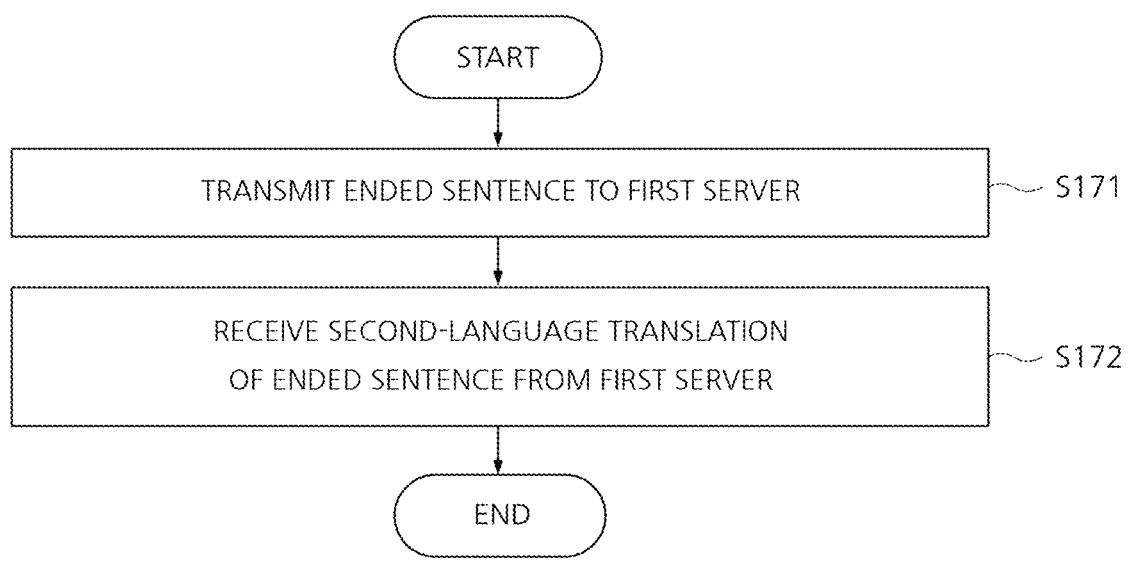
FIG. 13 is a flowchart of a process of acquiring a second-language translation of an ended sentence by the first terminal, according to an embodiment.

FIG. 13 is a flowchart of a process in which the first terminal 100 converts the ended sentence into the second-language translation using the external server, according to an embodiment. Referring to FIG. 13, in operation S171, the ended sentence may be transmitted to the first server 200. The first server 200 may be a server that provides a translation service. The communication interface 104 of the first terminal 100 may transmit the ended sentence to the first server 200. For example, the communication interface 104 may transmit an English text "I love you" to the first server 200.

In operation S172, the second-language translation of the ended sentence may be received from the first server 200. The first server 200 may convert a first-language sentence into a second-language translation of the first-language sentence. The first server 200 may transmit the converted translation to the first terminal 100.

The communication interface 104 of the first terminal 100 may receive the second-language translation of the ended sentence from the first server 200 as a response to the transmission of the ended sentence. The communication interface 104 may receive a second-language text as the second-language translation. For example, the communication interface 104 may receive "나는 당신을 사랑합니다." as the second-language translation of "I love you."

Figure 14:
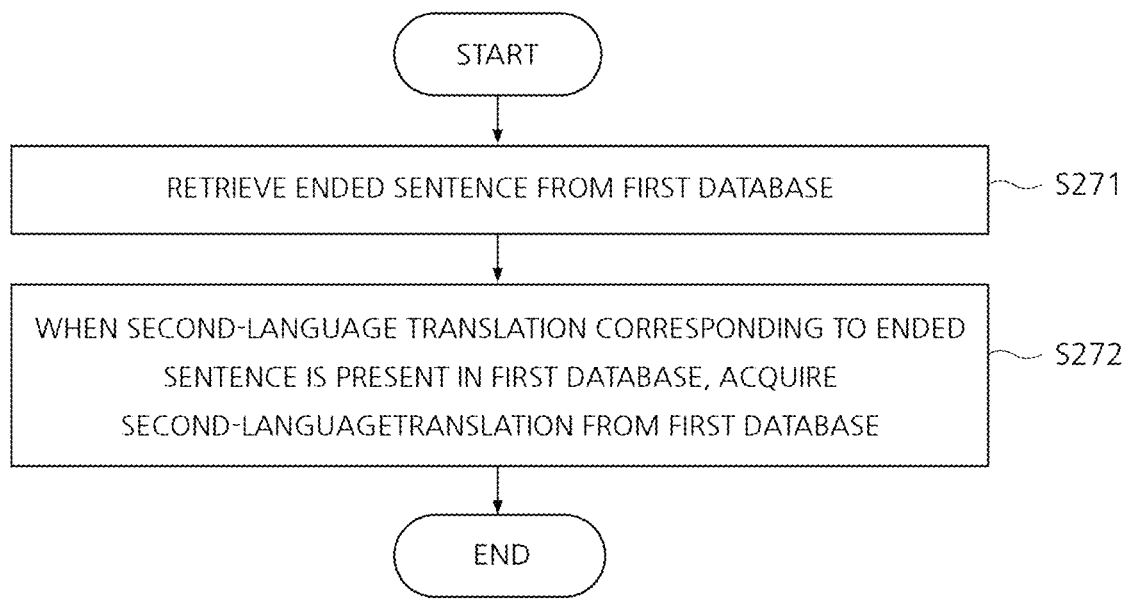
FIG. 14 is a flowchart of a process of acquiring a second-language translation of an ended sentence by the first terminal, according to another embodiment.

FIG. 14 is a flowchart of a process in which the first terminal 100 acquires the second-language translation of the ended sentence, according to another embodiment. Referring to FIG. 14, in operation S271, the detected ended sentence may be retrieved from a first database. The storage 103 of the first terminal 100 may include the first database. According to another embodiment, the first database may be disposed outside the first terminal 100.

The first database may be a translation database. The first database may be a relational database in which a first-language sentence and a second-language translation of the first-language sentence are stored. Records included in the first database may include a first-language sentence and a second-language translation of the first-language sentence.

The controller 102 of the first terminal 100 may retrieve the first-language ended sentence from the first database. In this manner, the controller 102 may determine whether the translation corresponding to the ended sentence is present in the first database.

In operation S272, when the second-language translation corresponding to the ended sentence is present in the first database, the translation may be acquired from the first database as a result of the retrieving. When a record corresponding to the ended sentence is included in the first database, the controller 102 of the first terminal 100 may acquire the translation from the first database.

Figure 15:
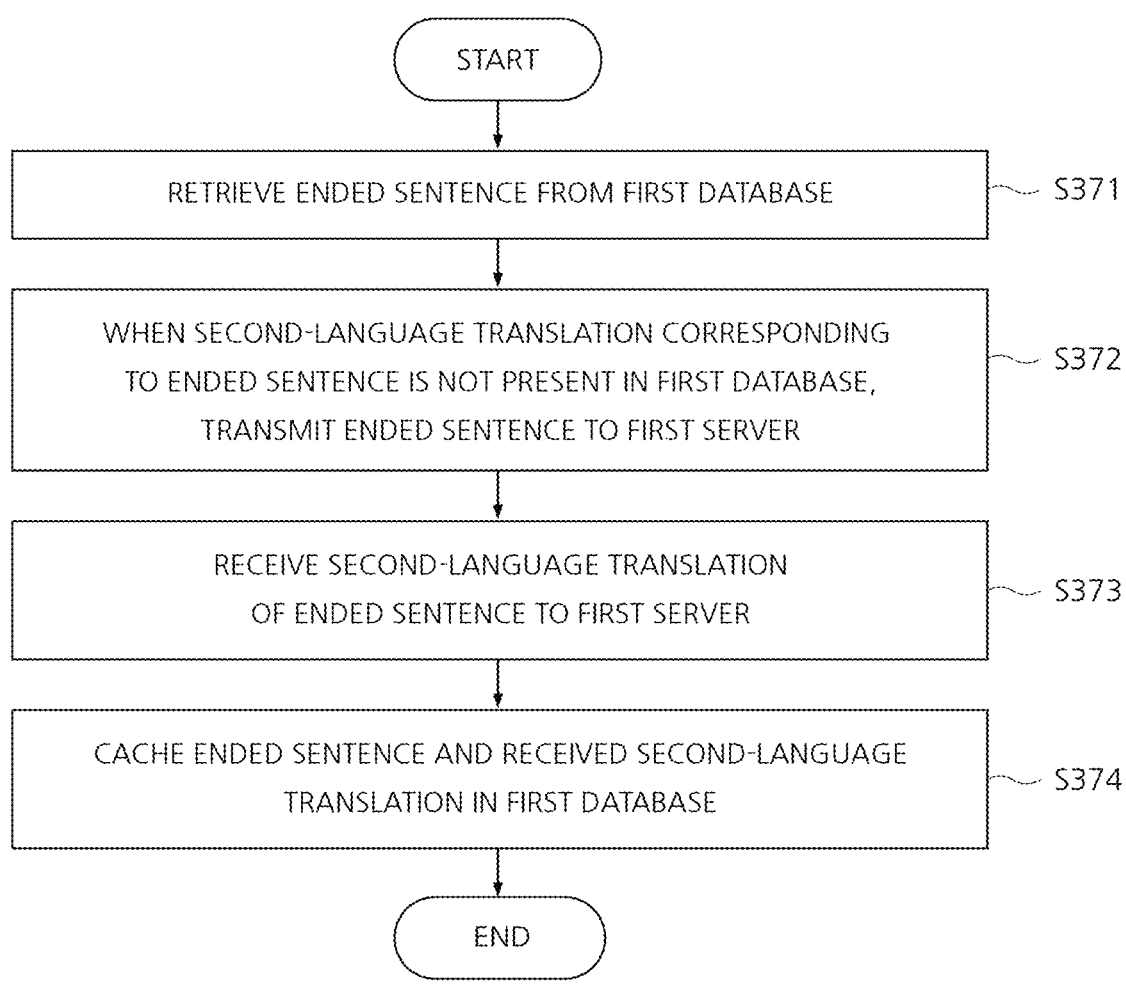
FIG. 15 is a flowchart of a process of acquiring a second-language translation of an ended sentence by the first terminal, according to another embodiment.

When the record corresponding to the ended sentence is not included in the first database, the first terminal 100 may acquire the translation by receiving the translation from the first server 200. FIG. 15 is a flowchart of a process in which the first terminal 100 acquires the second-language translation of the ended sentence, according to another embodiment.

Referring to FIG. 15, in operation S371, the detected ended sentence may be retrieved from the first database. In operation S372, when the second-language translation corresponding to the ended sentence is not present in the first database, the ended sentence may be transmitted to the first server 200.

The communication interface 104 of the first terminal 100 may transmit the ended sentence to the first server 200. The first server 200 may receive the ended sentence. The first server 200 may translate the ended sentence into a second language. The first server 200 may transmit the second-language translation to the first terminal 100.

In operation S373, the second-language translation of the ended sentence may be received from the first server 200. The communication interface 104 of the first terminal 100 may receive the translation from the first server 200.

In operation S374, the ended sentence and the received second-language translation may be cached in the first database. The first terminal 100 may store the ended sentence and the received second-language translation in the first database. The first database may newly generate records including the ended sentence and the received translation. Accordingly, when the ended sentence is retrieved from the first database next time, the first terminal 100 may be ready to acquire the translation as a result of the retrieving.

Referring to FIG. 3 again, in operation S180, the first terminal 100 may transmit the acquired translation to the second terminal 150. The communication interface 104 of the first terminal 100 may transmit the received translation to the second terminal 150. While the voice is being received, the communication interface 104 of the first terminal 100 may transmit the received translation to the second terminal 150. The second terminal 150 may receive the second-language translation. For example, the second terminal 150 may receive "나는 당신을 사랑합니다." from the terminal 100.

In operation S190, the second terminal 150 may substitute the words, which correspond to the translation among the displayed second-language words, with the translation. The output interface 105 of the second terminal 150 may substitute the words, which correspond to the translation among the displayed second-language words, with the received translation. While the received encoded voice is being continuously reproduced, the output interface 105 of the second terminal 150 may display the received translation. While the received second-language words are being continuously displayed, the output interface 105 of the second terminal 150 may substitute at least a part of the displayed second-language words with the received translation.

Figure 16:
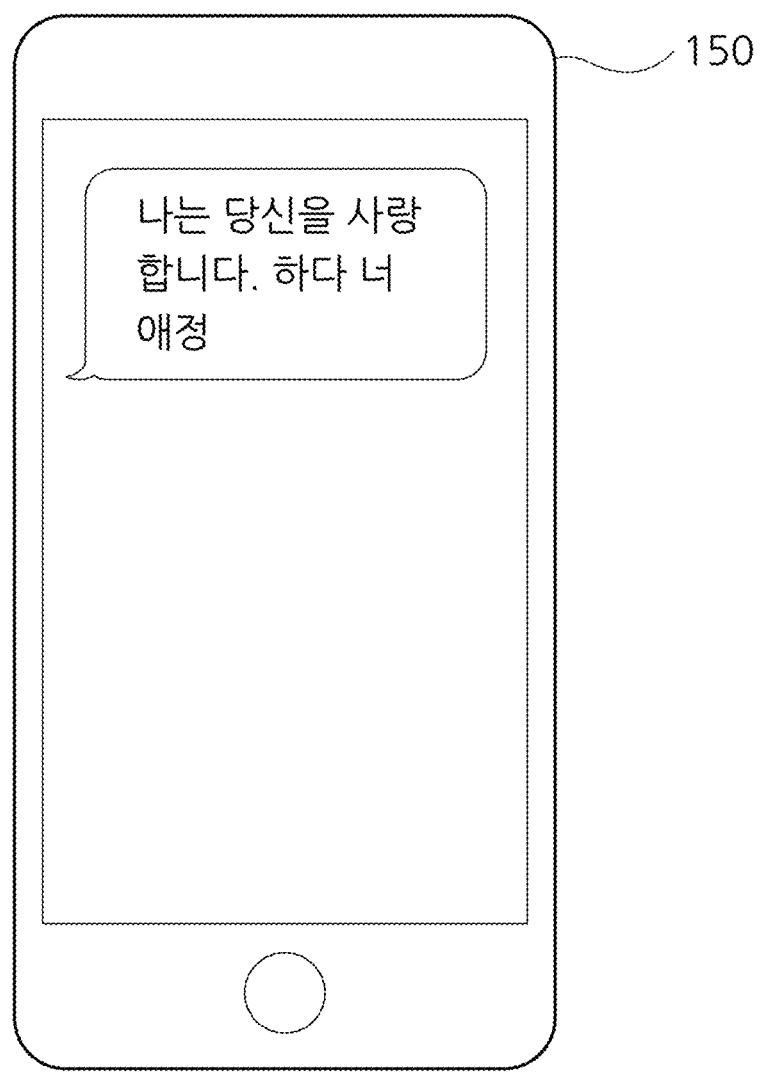
FIG. 16 is a reference diagram for describing a process of substituting displayed second-language words with a translation by the second terminal, according to an embodiment.
Figure 17:
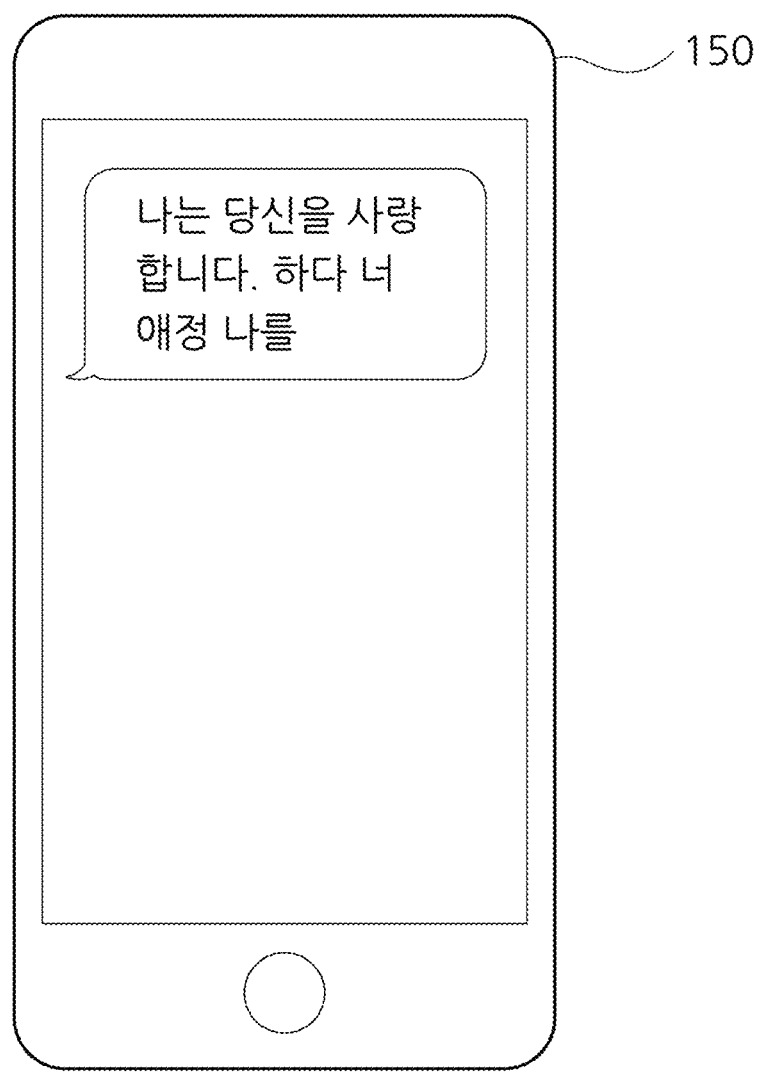
FIG. 17 is another reference diagram for describing a process of substituting displayed second-language words with a translation by the second terminal, according to an embodiment.
Figure 18:
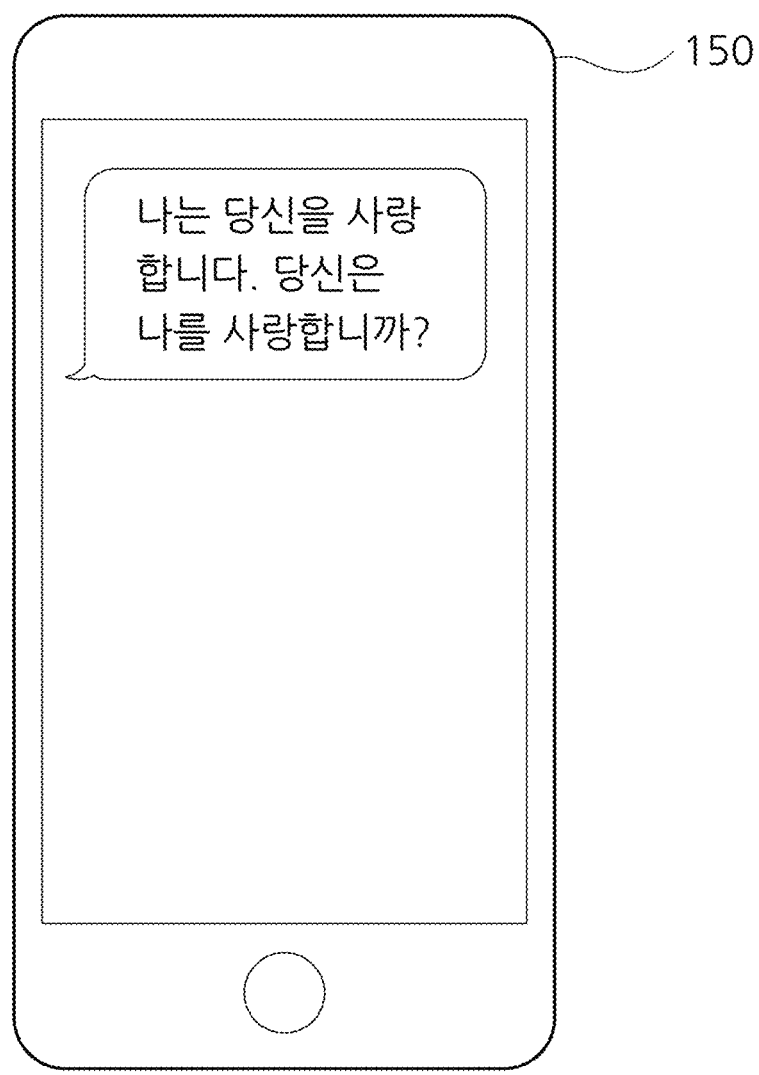
FIG. 18 is another reference diagram for describing a process of substituting displayed second-language words with a translation by the second terminal, according to an embodiment.

FIGS. 16 to 18 are reference diagrams for describing operation S190 in which the second terminal 150 substitutes the displayed second-language words with the translation, according to an embodiment. For example, the output interface 105 of the second terminal 150 may display "나는", "애정", "너", "하다", and "너" as the second-language words, as illustrated in FIG. 11. Then, the controller 102 of the second terminal 150 may additionally receive "애정" from the first terminal 100 as the second-language word. The output interface 105 of the second terminal 150 may additionally display "애정". That is, the output interface 105 may display "나는 애정 너 하다 너 애정".

At the same time, the second terminal 150 may receive "나는 당신을 사랑합니다." from the terminal 100 as the translation. The output interface 105 of the second terminal 150 may substitute the words corresponding to the translation, i.e., "나는", "애정", and "너", with the translation. That is, the output interface 105 may display "나는 당신을 사랑합니다 하다 너 애정", as illustrated in FIG. 16.

The communication interface 104 of the second terminal 150 may continuously receive the first-language word from the first terminal 100 since then. The output interface 105 of the second terminal 150 may continuously additionally display the received second-language word since then. For example, the communication interface 104 of the second terminal 150 may additionally receive "나를" as the second-language word. The output interface 105 of the second terminal 150 may additionally display "나를" as illustrated in FIG. 17. That is, the output interface 105 may display "나는 당신을 사랑합니다 하다 너 애정 나를".

Also, the controller 102 of the first terminal 100 may continuously detect an ended sentence from the voice recognition result since then. For example, the first terminal 100 may additionally detect the ended sentence "do you love me" from the voice recognition result "I love you do you love me". The first terminal 100 may acquire "당신은 나를 사랑합니까?" as the translation of the ended sentence.

The second terminal 150 may receive the translation from the first terminal 100. The output interface 105 of the second terminal 150 may substitute the second-language words, which correspond to the translation, with the translation. That is, the output interface 105 of the second terminal 150 may substitute the words corresponding to the translation, i.e., "하다", "너", "애정", and "나를", with the translation. The output interface 105 may display "나는 당신을 사랑합니다 당신은 나를 사랑합니까?", as illustrated in FIG. 18.

Accordingly, the second terminal 150 may first display the second-language words corresponding to the words included in the voice recognition result. Then, when the translation is received, the second terminal 150 may substitute at least one word, which corresponds to the translation among the displayed second-language words, with the translation. That is, even before acquiring the second-language translation of the ended sentence included in the voice recognition result, words that can be understood by the user of the second terminal 150 may be displayed as early as possible. Therefore, it is possible to reduce the time required for the user of the second terminal 150 to wait until the user of the second terminal 150 can understand the meaning of the words that the user of the first terminal 100 speaks.

According to embodiments, even though users making a video call use different languages, each user can understand what the other party is saying. Also, a smoother user experience can be provided. Furthermore, a user experience with improved reactivity can be provided. Moreover, an improved user experience can be provided.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Embodiments may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a certain method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of a video call between a first terminal of a first user speaking a first language and a second terminal of a second user speaking a second language, the method comprising:
    displaying, on a display screen of the first terminal, a video stream that is received from the second terminal and comprises the second user's verbal expression in the second language of a sentence comprising a first word, a second word and a third word in order and ending with the third word; and
    displaying, on the display screen of the first terminal, a sequence of visual representations in the first language along with the video stream,
    wherein displaying the sequence of visual representations comprises:

displaying a first visual representation in response to the first word of the second user's verbal expression, wherein the first visual representation comprises a translation of the first word in the first language on the display screen, subsequently, displaying, on the display screen, a second visual representation in response to the second word of the second user's verbal expression, wherein the second visual representation comprises the translation of the first word and a translation of the second word in the first language in order, further subsequently, displaying, on the display screen, a third visual representation in response to the third word of the second user's verbal expression, wherein the third visual representation comprises the translation of the first word, the translation of the second word, and a translation of the third word in the first language in order, and further subsequently, in response to detecting an end point of the second user's verbal expression of the sentence, displaying a translation in the first language of the sentence of the second user's verbal expression in replacement of the third visual representation such that the third visual representation disappears from the display screen and the translation of the sentence is presented on the display screen.

2. The method of claim 1, wherein the sentence is referred to as a first sentence and the video stream further comprises the second user's verbal expression in the second language of a second sentence following the first sentence, the first sentence ending with the third word, the second sentence comprising a fourth word following the third word of the first sentence, wherein a translation of the fourth word in the first language is presented prior to presentation of the translation of the first sentence such that the translation of the first word, the translation of the second word, the translation of the third word, and the translation of the fourth word are presented in order on the display.

3. The method of claim 1, further comprising processing the second user's verbal expression to detect the end point based on at least one of an intonation in the second user's verbal expression and a blank period of the second user's verbal expression.

4. The method of claim 3, wherein the end point is determined based on at least one of an intonation in the second user's verbal expression and a blank period of the second user's verbal expression.

5. The language translation method of claim 1, wherein the translation of the first word is presented before completion of the second user's verbal expression of the sentence.

6. The method of claim 5, wherein the translation of the second word is presented before completion of the second user's verbal expression of the sentence.

7. The method of claim 6, wherein the translation of the third word is presented before completion of the second user's verbal expression of the sentence.

8. A non-transitory computer-readable recording medium having recorded thereon a program for executing the language translation method of claim 1.

* * * * *